United States Patent Office 3,083,242
Patented Mar. 26, 1963

3,083,242
PREPARATION OF CERTAIN ORGANOMAGNESIUM CHLORIDES IN ETHYLENE POLYETHERS
Hugh E. Ramsden, Scotch Plains, N.J., assignor, by mesne assignments, to M & T Chemicals Inc., New York, N.Y., a corporation of Delaware
No Drawing. Filed Sept. 19, 1956, Ser. No. 610,722
2 Claims. (Cl. 260—665)

The present invention relates to a novel process for the preparation of specified organomagnesium chloride compounds and to processes utilizing said compounds for preparing a wide variety of organic compounds.

The preparation of organomagnesium chloride compounds, commonly known as Grignard reagents, has been known for more than fifty years. These compounds have usually been prepared in ethyl ether, which is a difficult and dangerous material to handle. Although other ethers have been experimented with in place of ethyl ether, the best results have been obtained with ethyl ether. U.S. Patent 2,552,676 discloses that specified dialkyl ethers of ethylene glycol have been found to be operative as solvents for the formation of Grignard reagents. The patentee claims that these glycol ethers may be used in place of ethyl ether and are also useful in the preparation of phenylmagnesium chloride, which is a difficult Grignard reagent to prepare in ethyl ether. However, phenylmagnesium chloride has been prepared in ethyl ether and even in the absence of any ether. To prepare phenylmagnesium chloride in these glycol ethers, the patentee required long initiation periods and freshly cut magnesium chips. His preferred procedure involved an intricate and expensive apparatus to prepare the magnesium chips in situ.

Over the years, a vast amount of experimentation has taken place in the preparation and attempted preparation of numerous organomagnesium halides. Different organic halides have been found to exhibit great differences in their reactivity with magnesium. This was also found to be true in cases wherein the various organic halides contained the same organo group. Generally the organic bromides react most readily, then the organic iodides, and most slowly, the organic chlorides. In addition to the differences in the reactivity of the different halides bonded to the same organic groups, different organic groups bonded to the same halide also have been found to influence the degree of reactivity of the organic halide. This difference in reactivity is so great that whereas some organic halides react extremely rapidly with magnesium, other organic halides have been thought to be completely unreactive. Vinyl halides have been found to be the least reactive, in fact, vinyl chlorides have been thought completely unreactive with magnesium to form vinylmagnesium chlorides. The heterocyclic chlorides of the type that exhibit aromatic or pseudo-aromatic characteristics have also been thought to be unreactive with magnesium, although I have now found that they are somewhat more reactive than the vinyl chlorides. Although many attempts have been made to prepare vinylicmagnesium chlorides and these heterocyclic magnesium chlorides, so far as I am aware, such attempts have all been unsuccessful prior to my invention.

I have now discovered a process for preparing vinylicmagnesium chlorides and heterocyclic magnesium chlorides, and processes for utilizing said compounds to prepare organic compounds and organometallic compounds.

It is an object of the present invention to provide a process for preparing vinylicmagnesium chlorides.

Another object of the invention is to provide a process for preparing heterocyclic magnesium chlorides.

My invention also contemplates a process for preparing vinylic and heterocyclic magnesium chlorides from commercially available magnesium turnings.

It is a further object of the invention to provide an efficient and relatively simple process for the preparation of vinylicmagnesium chlorides and heterocyclic magnesium chlorides.

Still another object of the present invention is to provide a process for producing a wide variety of organic and organometallic compounds by the utilization of said novel vinylmagnesium chlorides and novel heterocyclic magnesium chlorides.

Other objects and advantages will become apparent from the following description and claims.

Generally speaking, the present invention relates to the preparation of vinylicmagnesium chlorides and heterocyclic magnesium chlorides (RMgCl) in diethers of ethylene glycols and polyethylene glycols (herein called ethylene polyethers). R refers to vinylic or heterocyclic groups and is further defined hereinafter. The ethylene polyethers operative in the present process have the general formula:

$$R_d O(CH_2CH_2O)_x R_e$$

wherein $R_d$ and $R_e$ may be the same or different and are selected from the class consisting of aliphatic hydrocarbon groups having 1 to 5 carbon atoms in the chain, phenyl groups and substituted phenyl groups having not more than 5 atoms in each substituting group (and not more than 3 substituting groups), and aralkyl groups in which the aryl portion of the group is phenyl and having not more than 3 or 4 carbon atoms in the alkyl portion of the group; the permissible substituting groups being those that do not react with components of the reaction mixture and/or reaction products, under the conditions utilized, and $x$ equals a whole number from 1 to 8. The preferred ethylene polyethers are diethylene glycol diethyl ether, ethylene glycol dimethyl ether, diethylene glycol dimethyl ether, triethylene glycol dimethyl ether and tetraethylene glycol dimethyl ether.

The vinylic and heterocyclic magnesium chlorides (RMgCl) are prepared by activating magnesium and then adding to the activated magnesium a solution of the vinylic or heterocyclic chloride (RCl) in the ethylene polyether. The rate of addition of the ether-RCl solution is controlled so that it does not quench the reaction and yet is at a sufficient rate so that the reaction is not allowed to die. The reaction is usually carried out at a temperature between room temperature (or lower) and the reflux temperature of the reaction mixture and preferably below about 100° C. The temperature will vary dependent upon the particular ethylene polyether utilized and the vinylic or heterocyclic chloride utilized. Lower temperatures are usually preferred as side reactions are kept to a minimum. It is desirable that the reaction be carried out under an inert atmosphere, preferably nitrogen, which is cheapest. Agitation of the reaction during the course of the reaction is preferable.

The reaction is started by initiation, which serves to activate the magnesium. Initiation is accomplished by adding to the magnesium, in the presence of a small amount of an ether, e.g. an alkyl ether, an ethylene polyether, a cyclic polymethylene oxide ether, etc., a small amount of an alkyl or aryl halide such as ethyl bromide, butyl bromide, isopropyl chloride, allyl chloride, ethyl chloride, allyl bromide, bromobenzene, benzyl chloride, methyl iodide, etc. In some cases it is helpful to add a crystal of iodine with the halide and ether. Initiation is preferably carried out in the absence of the RCl-ethylene polyether mixture or in the presence of not more than about 25 milliliters of RCl-ethylene polyether mixture per mole of magnesium present. When the initiation is carried out in the presence of the RCl-ethylene polyether mixture, it may be accomplished by the addition of a small amount of the halide without additional ether. When larger amounts of the RCl-ethylene polyether mixture are present, it is more difficult, and sometimes impossible, to initiate. Thus initiation, for the preparation of vinylmagnesium chloride, was accomplished in the presence of 50 milliliters of a mix, with 4 milliliters of ethyl bromide at 40° C.; in the presence of 75 milliliters of mix, with 7 milliliters of ethyl bromide at 40° C.; and with 85 milliliters of mix, with 4 milliliters of ethyl bromide by heating first at 50° C. and then raising the temperatures to 90° C. The three initiations carried out at 40° C. went almost instantaneously. It is preferred that initiation be carried out at as low a temperature as possible since it is sometimes possible to cleave the ethylene polyethers at higher temperatures. When large amounts of initiation mix are added the temperature rises quickly. Therefore, it is preferred to use not more than 25 milliliters of RCl-ethylene polyether mixture with up to about 5 milliliters of an alkyl or aryl halide per mole of magnesium.

The nature of Grignard reagents has not been definitively determined. Some textbooks suggested that it is an equilibrium between the organomagnesium chloride and a mixture of a magnesium dihalide and diorganomagnesium. The function of the ether is also not well understood. There is evidence that complex compounds, probably etherates, are present at some stage of the reaction and function in the formation of the organomagnesium compound. None of the various theories advanced to explain the reaction is completely or even generally accepted by most of those specializing in this field of chemistry. They do not explain why some organic chlorides do not function in the usual ethers. When the term, organomagnesium chloride, or the formula RMgCl, is used herein, it is meant to include the complexes with the ethylene polyethers; said complexes being novel compositions of matter.

The term "vinylic" in the present invention includes not only the vinyl group $CH_2=CH-$ but also the related groups in which one or more of the hydrogen atoms have been substituted by other groups; thus the term includes the vinylene, vinylidene and other like groups.

The compounds utilized in this invention, RCl, when R is the vinylic group may be described by the general formula

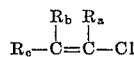

wherein $R_a$ may be chlorine or fluorine and any other element or group not reactive with any of the reactants or reaction products and include hydrogen and substituted and unsubstituted aliphatic radicals (including vinylic and allylic radicals), and aryl radicals, cycloaliphatic radicals, aliphatic and aromatic oxy radicals (e.g., alkoxy radicals, aryloxy radicals, allyloxy radicals, etc.), organosilyl radicals (e.g., triarylsilyl or trialkylsilyl radicals), organostannyl radicals (e.g., trialkylstannyl radicals), and organomercapto radicals (e.g., alkylthio radicals); $R_b$ and $R_c$ may be the same or different and may be hydrogen and substituted and unsubstituted aliphatic radicals (including vinylic and allylic radicals), cycloaliphatic radicals, organosilyl radicals (e.g. triarylsilyl or trialkylsilyl radicals), and organostannyl radicals (e.g., trialkylstannyl radicals); where two or more carbon groups may be linked or condensed to form a cyclic ring (e.g., cyclohexen-1-yl-1 chloride). $R_a$, $R_b$, or $R_c$ may not be substituted by functional groups or elements reactive to any of the reactants or reaction products.

The length and size of the $R_a$, $R_b$, and $R_c$ groups are not critical, since by definition, the groups are not reactive with the reactants or reaction products under process conditions. However, with presently available materials it is not contemplated that hydrocarbon chains having more than 30 carbon atoms would be utilized as substituting groups.

Among the vinylic chlorides useful in this invention are chlorides of the following: vinyl, 1-propenyl, 1-pentenyl, and so forth. Typical of vinylic chlorides which may be used in the practice of this invention are 1,1 dichloro-1-propene, 1 chloro-1-propene, 2 chloro-1-propene, 3 chloropentene-2, 1 (or 2) chloropentene, α (or β) chlorostyrene, 1 chloro isobutene-1, 2 methyl-3-chlorobutene-2, α chloromethylenecyclohexene, 1-chlorocyclohexene, 1-chlorobutadiene 1,3; p-methoxy α chlorostyrene, p-methoxy β chlorostyrene, etc.

From the above it is evident that the vinylic chlorides employed in the present invention all have the characterizing feature that at least one chlorine atom is bonded directly to a carbon atom which carries an ethylenically unsaturated double bond. Through the use of the process of this invention, magnesium chloride compounds are prepared wherein the magnesium group is bonded through magnesium and directly to a carbon atom carrying an ethylenically unsaturated double bond.

These chlorides react with magnesium under the conditions of the present invention to form compounds of the formula

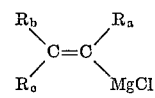

$R_a$, $R_b$, and $R_c$ having the definitions given herein before.

Among the heterocyclic chloride compounds used to form the heterocyclic magnesium chlorides of this invention, are the following:

(1) Furan and polynucleate compounds having a furan ring such as—

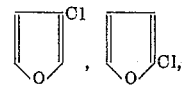

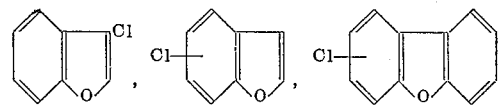

(2) Thiophene, benzothiophene, dibenzothiophene, and other thiophene type compounds such as—

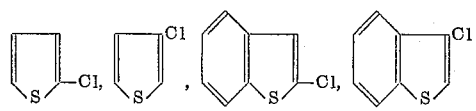

(3) Pyrrole, benzopyrrole, dibenzopyrrole, and other compounds containing the pyrrole ring structure such as—

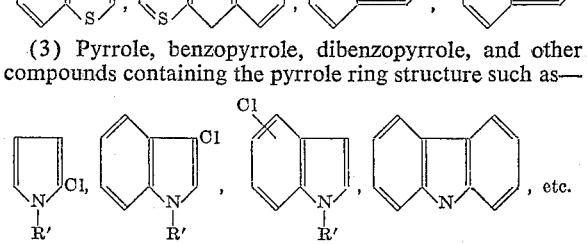

where R' represents any organic radical non-reactive to the heterocyclic magnesium chloride.

(4) Compounds containing the pyridine ring structure such as—

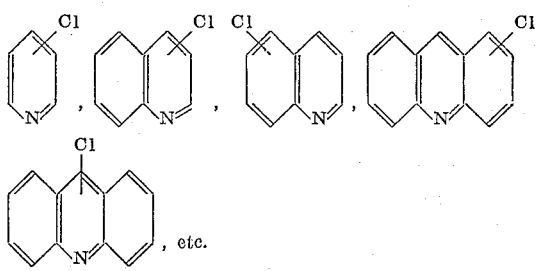

(5) Thiazole, oxazole and imidazole type compounds like—

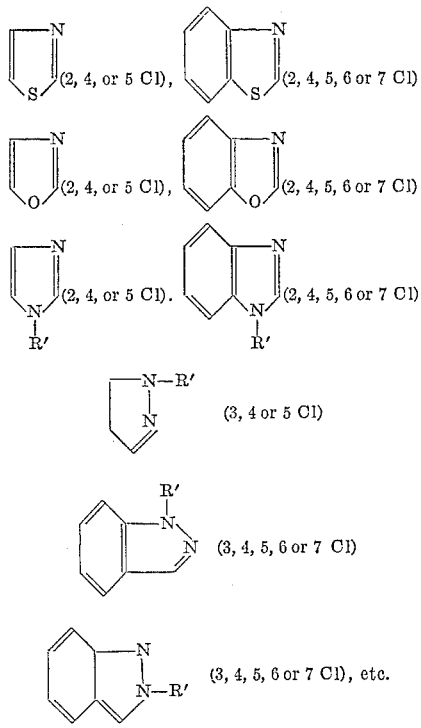

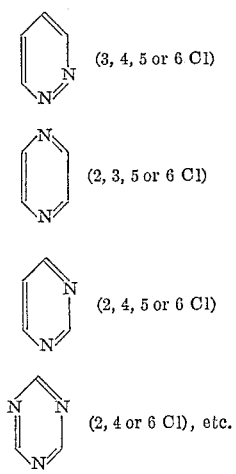

(6) Pyridazine, pyrazine, pyrimidine and triazine type compounds like—

The heterocyclic compounds of this invention (1) preferably contain one or more of the elements from the class consisting of oxygen, sulfur and ternary nitrogen in the heterocyclic ring system; (2) must contain at least one chlorine atom attached (bonded) to a carbon atom that is part of the heterocyclic ring system, said carbon atom being part of the aromatic system; and (3) must exhibit aromatic or pseudoaromatic resonance characteristics. Heterocyclic ring systems that exhibit aromatic or pseudoaromatic resonance characteristics are also refered to, in the art, as exhibiting aromatic or pseudoaromatic characteristics.

The heterocyclic compounds may contain one ring or be polynucleate in structure. Any and all of the hydrogen atoms of the nucleus or nucleii may be replaced by chlorine, fluorine, monovalent radicals, and polyvalent radicals (usually divalent) arranged in such a manner as to form condensed rings. The organic substitutents may be alkyl (substituted or unsubstituted) radicals, aryl (substituted or unsubstituted) radicals, alkoxy (substituted or unsubstituted) radicals, or aryloxy (substituted or unsubstituted) radicals, and where any two adjacent hydrocarbon groups may be linked or condensed to form a cyclic saturated or further condensed aromatic ring, or a combination of the two, with the limitation that the substituents may not themselves be functional groups reactive to heterocyclic magnesium chloride and/or ethylene polyethers. The length and size of the radicals that may replace the hydrogen of the heterocyclic nucleus or nucleii are not critical, since by definition, the groups are not reactive with the reactants or reaction products under process conditions. However, with presently available materials it is not contemplated that the hydrocarbon chains having more than 30 carbon atoms would be utilized as substituting groups.

In its broadest aspect, the present invention contemplates preparation of vinylic or heterocyclic magnesium chlorides, substituted or unsubstituted, by reacting the respective chloride with magnesium to form a Grignard-type reagent. This reagent can then be reacted with another compound in a manner analogous to the classic Grignard synthesis to yield the desired product. This synthesis may be carried out in the ethylene polyether as the reaction medium. However, this is not a requirement of the process and the synthesis may be carried out utilizing other solvents, e.g., toluene, xylene, pentane, hexane, heptane, decane, benzene, methylcyclohexane, cyclopentane, petroleum ethers, ligroins, kerosene, etc. in place of the ethylene polyether as the reaction medium. An example of this over-all process is the preparation of divinylcarbinol. One mole of ethyl formate is added to vinyl magnesium chloride in an ethylene polyether solution and reacts to yield (after hydrolysis of the initial product) a fairly good yield of divinylcarbinol. The equations follow:

$$CH_2=CHCl + Mg \rightarrow CH_2=CH-MgCl$$

$$CH_2=CHMgCl + C_2H_5O_2CH \longrightarrow \underset{\underset{OMgCl}{|}}{CH_2=CHCHCH=CH_2}$$

$$\underset{\underset{OMgCl}{|}}{CH_2=CHCHCH=CH_2} + H_2O \longrightarrow \underset{\underset{OH}{|}}{CH_2=CHCHCH=CH_2}$$

Equations illustrative of the wide variety of syntheses within the scope of the present invention follow. For simplicity, the illustrative equations are of the over-all syntheses; do not show the hydrolysis step and do not show the oxy magnesium chloride products, all of which are to be understood as being part of such equation:

RMgCl+R'CHO→RR'CHOH
RMgCl+R'R"CO→RR'R"COH $$RMgCl + R'CO_2R'' \longrightarrow RR'CO$$
$$\downarrow RMgCl$$
$$RMgCl + RR'CO \longrightarrow R_2R'COH$$

RMgCl+R'COX→RR'CO
RMgCl+R'CN→RR'CO
RMgCl+R"C(OR')₃→RR"C(OR')₂

$$RMgCl + HC(OR')_3 \longrightarrow R\overset{H}{\underset{|}{C}}(OR')_2$$

$$RMgCl + R'R''C\underset{\diagdown O \diagup}{\overline{\qquad}}CR'''R'''' \longrightarrow$$

$$RR'R''CCOHR'''R'''' + R'R''COHCRR'''R''''$$

RMgCl+R'X→RR'
RMgCl+R'OSO₂R"→RR'
RMgCl+R'OSO₂OR'→RR'
RMgCl+XCH(R')OR"→RCH(R')OR"
RMgCl+R'CH(X)CH₂OR"→R'CH(R).CH₂OR"
RMgCl+R'R"XCCO₂R'''→RR'R"CCO₂R'''
RMgCl+S→RSH
RMgCl+Se→RSeH
RMgCl+Te→RTeH
RMgCl+O₂→ROH
RMgCl+SO₂→RSO₂H

RMgCl+SO$_2$Cl$_2$→RSO$_2$Cl
RMgCl+S$_2$Cl$_2$→RS$_2$R
RMgCl+MX$_b$→R$_b$M [$b$=valence of metal (M)]
RMgCl+CO$_2$→RCO$_2$H
2RMgCl+CO$_2$→R$_2$CO
RMgCl+CS$_2$→RCS$_2$H
RMgCl+XCO$_2$R'→RCO$_2$R' wherein R is a heterocyclic or vinylic radical as defined above and R', R'', R''' and R'''' are hydrocarbon groups, e.g., aliphatic, cycloaliphatic, aromatic, heterocyclic, mixtures or combinations of these, etc., which may be substituted by other groups, elements and/or radicals not reactive with other components of the reaction mixtures under the process conditions or with the products; M is a metal or metalloid from one of the following groups of the periodic table: Ib, IIb, III, IV, V, VI, VII, and VIII; and X is fluorine, chlorine, bromine, or iodine.

The following examples are further illustrative of the present invention. It is to be understood, however, that the invention is not restricted to the specific embodiments described herein in detail.

*Example 1*

One gr.-atom of magnesium was placed in a flask to which was added 25 ml. of a solution of 1 mole of vinyl chloride in 3 moles of diethylene glycol diethyl ether. The reaction was initiated with the addition of 2 ml. of ethyl bromide. The remainder of the vinyl chloride-poly ether mixture was slowly added with agitation. At the completion of the reaction the heating mantle which had maintained the temperature between 80° and 90° was turned off and the reaction mixture allowed to cool. The yield of vinylmagnesium chloride, as determined by the standard Gilman test titration was 93%.

*Example 2*

To 0.5 gr.-atom of magnesium and an iodine crystal, after purging with nitrogen, was added 3 ml. of ethyl bromide in 9 ml. of ethyl ether to initiate the reaction. The reaction began immediately and a mixture of 0.5 mole of 2-chlorothiophene in 1.5 mole of diethylene glycol diethyl ether was slowly added, with agitation. The reaction was exothermic and was held between 50° and 55° C. After completion of the addition the reaction mixture was stirred for about 5 hours and then allowed to cool. The yield of 2-thienyl magnesium chloride, as determined by the standard Gilman test, was 97%.

*Example 3*

To a charge containing 1 gr.-atom of magnesium and an iodine crystal was added 15 to 20 ml. of a mixture of 2.5 moles of vinyl chloride in 3.9 moles of diethylene glycol dimethyl ether, together with 1 to 2 ml. of ethyl bromide and 1 to 2 ml. of ethyl ether. The reaction did not immediately begin and additional ethyl bromide and iodine were added to initiate. The reaction started and the remainder of the vinyl chloride-ethylene polyether was slowly added with agitation. The yield of vinyl magnesium chloride, as determined by the standard Gilman test, was 69%.

*Example 4*

The vinylmagnesium chloride product of Example No. 3 was separated and reacted with carbon dioxide in an acid medium to yield acrylic acid. The yield of the carboxylic acid, based on the amount of magnesium reacted, was 75.3%.

*Example 5*

To 1 gr.-atom of magnesium and a crystal of iodine was added approximately 20 ml. of a solution composed of 1.25 moles of vinyl chloride in 3.9 moles of triethylene glycol dimethyl ether, 1 to 2 ml. of ethyl bromide and 1 to 2 ml. of ethyl ether. The reaction did not start immediately and a small amount of a mixture of ethyl bromide, ethyl ether, iodine, and magnesium was added. The reaction commenced and the remainder of the vinyl chloride-ethylene polyether solution was slowly added. The yield of vinylmagnesium chloride was 69%.

*Example 6*

To a charge of 1 gr.-atom of magnesium and a crystal of iodine was added 20 ml. of a reaction mixture comprising 1.25 moles of vinyl chloride in 3.9 moles of tetraethylene glycol dimethyl ether. Heat was applied and the reaction initiated. The remainder of the vinyl chloride-ethylene polyether mix was then slowly added. The yield of vinylmagnesium chloride was 49%.

*Example 7*

By the process of Example 2; 2,5-dichlorothiophene dissolved in octaethylene glycol ethylamyl ether yields 5-chlorothienylmagnesium chloride.

*Example 8*

By the process of Example 3; α-chloropyridine dissolved in pentaethylene glycol diphenyl ether yields α-pyridylmagnesium chloride.

*Example 9*

By the process of Example 5; N-methyl-2-chloropyrrole yields 2-N-methylpyrrylmagnesium chloride.

*Example 10*

By the process of Example 6; the various chloroquinolines yield:

| | |
|---|---|
| 2-chloroquinoline | 2-quinolylmagnesium chloride |
| 6-chloroquinoline | 6-quinolylmagnesium chloride |
| 8-chloroquinoline | 8-quinolylmagnesium chloride |

*Example 11*

By the process of Example 2; 2-chlorobenzothiazole dissolved in diethylene glycol di-t-butylphenyl ether yields 2-benzothiazolylmagnesium chloride.

*Example 12*

By the process of Example 2; 2-chloropyrimidine dissolved in triethylene glycol dixylyl ether yields 2-chloropyrimidylmagnesium chloride.

*Example 13*

By the process of Example 2; 2-chloroacridine dissolved in diethylene glycol di(phenylpropyl)ether yields 2-acridylmagnesium chloride.

*Example 14*

By the process of Example 2; 2-chlorobenzoxazole dissolved in ethylene glycol dimethyl ether yields 2-benzoxazolylmagnesium chloride.

*Example 15*

By the process of Example 2; β-tolylvinyl chloride dissolved in diethylene glycol ethylbutyl ether yields β-tolylvinylmagnesium chloride.

*Example 16*

By the process of Example 3; β-naphthylvinyl chloride, yields β-naphthylvinylmagnesium chloride.

*Example 17*

By the process of Example 2; β-phenylmethylvinyl chloride yields β-phenylmethylvinylmagnesium chloride.

*Example 18*

By the process of Example 1; β,β-didecylvinyl chloride yields β,β-didecylvinylmagnesium chloride.

*Example 19*

By the process of Example 2; α-phenyl-β,β-diethylvinyl chloride yields α-phenyl-β,β-diethylvinylmagnesium chloride.

Example 20

By the process of Example 3; 2-chloropropene in triethylene glycol dixylyl ether, yields 2-propenylmagnesium chloride.

Example 21

By the process of Example 2; 2-chloro-4-methyl-2-pentene yields 4-methyl-2-penten-2-yl magnesium chloride.

Example 22

By the process of Example 2; 1-chlorocyclohexen-1 dissolved in diethylene glycol di(phenylpropyl) ether yields 1-cyclohexen-1-yl magnesium chloride.

Example 23

By the process of Example 3; β-chloro-β-methyl styrene dissolved in triethylene glycol dixylyl ether yields α-methyl-β-phenylvinylmagnesium chloride.

Example 24

Vinylmagnesium chloride from Example 1 is poured over an excess of powdered Dry Ice, and the resultant solution acidified with hydrochloric acid which causes a precipitate to form. Water is added and dissolves the precipitate forming 2 layers, an organic layer and an aqueous layer. The layers are separated and acrylic acid recovered from the organic layer.

Example 25

α-Pyridyl magnesium chloride of Example 8 is added to 1 mole of carbon disulfide. The temperature is maintained at about 20° C. α-Pyridyl-dithiocarboxylic acid is recovered from the organic layer.

Example 26

One mole of vinylmagnesium chloride of Example 1 is slowly added to one mole of benzaldehyde. Dilute hydrochloric acid is added and the reaction mixture neutralized with sodium bicarbonate. Phenylvinyl-carbinol is recovered from the organic layer.

Example 27

Eqimolar parts of 2-thienylmagnesium chloride of Example 2 and cyclohexanone are reacted for 2 hours at 70°–80° C. The reaction flask is cooled and the mixture hydrolized with dilute sulfuric acid and the excess acid neutralized by sodium bicarbonate. 1-(α-thienyl)1-cyclohexanol is recovered from the organic product.

Example 28

One-half mole of ethylsuccinate is slowly added to 2 moles of vinylmagnesium chloride in excess diethylene glycol diethyl ether over a half-hour period of time. The reaction mixture is agitated and a dry nitrogen atmosphere maintained; and the temperature held between 20°–30° C. by means of an ice bath. The reaction continues slowly after the completion of the addition. At the end of an 8 hour period, the batch is cooled to 10° C. and hydrolized with dilute hydrochloric acid to form an aqueous layer and an organic layer. The diethyl ether of diethylene glycol and the solvent are stripped from the organic portion and 3,6-divinyl-3,6-dihydroxyoctadiene-1,7 is recovered by distillation at reduced pressure.

Example 29

Following the procedure of Example 28; diethyl sebacate (1 mole) is reacted with vinylmagnesium chloride (2 moles) to yield ethyl 10, 10-divinyl-10 hydroxycaprate.

Example 30

Two moles of 2-thienylmagensium chloride dissolved in excess diethylene glycol dimethyl ether are reacted with 1 mole of oxalyl chloride (in the presence of zinc chloride) under the conditions of Example 28 to yield di 2-thienoyl.

Example 31

One mole of 2-pyridylmagnesium chloride in excess ethylene glycol dimethyl ether is added to a stirred solution of 4 moles of dimethylformamide dissolved in the benzene under the conditions of Example 28. From the organic layer pyridine-2-aldehyde is recovered.

Example 32

Two moles of 5-chloro-2-thienylmagnesium chloride dissolved in excess tetraethylene glycol dimethyl ether are reacted with 2 moles of acetonitrile, under the conditions of Example 28 to yield 5-chloro-2-thienyl methyl-ketone after acid hydrolysis.

Example 33

One mole of 2-buten-2-yl-magnesium chloride is excess triethylene glycol dimethyl ether is added to a stirred solution of 1 mol of diethyl oxalate dissolved in this cyclohexane under the conditions of Example 28. From the organic layer ethyl di (2-buten-2-yl) hydroxyacetate is recovered.

Example 34

One mole of ethylene oxide dissolved in ether is slowly added to 1 mole of 2-propen-2-ylmagnesium chloride dissolved in diethylene glycol diethyl ether with constant agitation. After the addition is complete, heating to refluxed was applied and continued until the mixture becomes a grey slurry, and thereafter continued for one hour. The reaction is cooled and hydrolized with dilute hydrochloric acid to form an aqueous layer and an organic layer. The organic layer is stripped of solvents and β-2-propen-2-ylethanol recovered.

Example 35

Following the procedure of Example 34; ethylene oxide is reacted with 2-N-methylpyrrylmagnesium chloride to yield β-2-N-methylpyrrylethanol.

Example 36

One mole of vinylmagnesium chloride dissolved in diethylene glycol diethyl ether is reacted with 1 mole of allyl chloride under the conditions of Example 28, with a condenser in the setup, because of the high volatility of the vinyl chloride. The product, 1,4-pentadiene is recovered from the organic layer.

Example 37

One mole of 2-thienyl-magnesium chloride dissolved in excess diethylene glycol diethyl ether is reacted with 1 mole of dibutyl sulphate to yield 2-butylthiophene.

Example 38

Eqimolar quantities of 2-furylmagnesium chloride dissolved in excess tetraethylene dimethyl ether is reacted with gammachloro-propyl p-toluenesulfonate to yield 2-(gamma-chloropropyl) furan.

Example 39

Two moles of 1-cyclohexenylmagnesium chloride dissolved in diethylene glycol diethyl ether are reacted with 1 mole of chloromethyl ether to yield di(1-cyclohexenylmethyl) ether.

Example 40

One mole of vinylmagnesium chloride dissolved in diethylene glycol diethyl ether is added slowly with stirring to a cooled solution of 1 mole of ethyl bromoacetate in heptane. After the addition is completed, gentle stirring is continued for 2 or 3 hours. The reaction mixture is cooled and hydrolized with a dilute hydrochloric acid. The layers are separated, the aqueous layer being extracted twice with small portions of benzene, the extract added to the organic layer and the organic layer stripped of solvent. Ethyl 3-butenoate is separated from the excess ethyl bromoacetate by fractional distillation.

Example 41

Following the procedure of Example 40; α-furyl-magnesium chloride is reacted with ethyl chloroacetate to yield ethyl-α-furylacetate.

Example 42

Air, freed from carbon dioxide by passing through sodium hydroxide solution, is bubbled slowly into a solution of vinylmagnesium chloride dissolved in diethylene glycol diethyl ether until a negative Gilman color test is obtained. After the negative test is obtained, the solution is heated to 60° C. and the air passage stopped, followed by the addition of vinylmagnesium chloride until a positive Gilman color test is obtained. The solution is then cooled and hydrolized to yield an aqueous layer and an organic layer. Acetaldehyde is recovered from the organic layer.

Example 43

Substituting sulphur dioxide for air in the procedure of Example 42 results in the preparation of vinyl sulfinic acid, the second addition of vinylmagnesium chloride not being necessary.

Example 44

Substituting α-thienylmagnesium chloride for vinylmagnesium chloride and sulphur dioxide for air in the procedure of Example 43 results in the preparation of α-thienylsulfinic acid.

Example 45

To 1 mole of tin tetrachloride in 2 liters of heptane are slowly added 4.8 moles of vinylmagnesium chloride dissolved in excess diethylene glycol diethyl ether. The mixture is stirred until the reaction is complete. The temperature is maintained at about 50 to 60° C. The reaction is carried out under a dry nitrogen atmosphere. The mixture is then hydrolized by the addition of 2 liters of water containing a small amount of dilute hydrochloric acid. The hydrolysis results in the appearance of an aqueous layer and an organic layer. The solvents are removed from the organic layer by distillation and the residue fractionally distilled under reduced pressures to yield tetravinyltin, B.P. 130° C. at 760 mm.

Example 45a

Germanium tetrachloride is substituted for tin tetrachloride in the procedure of Example 45 to yield tetravinyl germanium.

Example 45b

To 1 mol. of phenyltin trichloride in 2 liters of hexane are added 3 mols of vinylmagnesium chloride dissolved in excess diethylene glycol dimethyl ether. The mixture is stirred until the reaction is complete and is then hydrolized by the careful addition of 1.5 liter of slightly acidified water. The organic layer is separated and the solvents removed by distillation. The residue is fractionally distilled under reduced pressure to yield trivinylphenyltin.

Example 46

To 1 mole of vinyltin trichloride in 1 liter of heptane is added 1 mole of thienyl magnesium chloride dissolved in diethylene glycol diethyl ether. The mixture is stirred until the reaction is completed and then hydrolized. The organic layer is separated and the solvents removed by distillation. The residue is fractionally distilled to yield trienyl vinyltin dichloride with vinyldithienyltin chloride and unchanged vinyltin trichloride.

Example 47

Silicon tetrachloride is substituted for tin tetrachloride in the procedure of Example 45, to yield tetravinylsilicon.

Example 48

Phenyl silicon trichloride is substituted for phenyltin trichloride in the procedure of Example 45b to yield trivinylphenylsilicon. The reaction mixture is filtered rather than hydrolyzed.

Example 49

One-third of a mole of boron trichloride dissolved in excess toluene is gradually added to an agitated solution of vinylmagnesium chloride in triethylene glycol dimethyl ether. The reaction is cooled during the addition and also for 3 hours of agitation after completion of the addition. The reaction mixture is then filtered, and trivinylborane recovered by distillation. All of this procedure is carried out in an argon gas filled dry box.

Example 50

Aluminum trichloride is substituted for boron trichloride in the procedure of Example 49 to yield trivinylaluminum.

Example 51

Mercury dichloride is substituted for boron trichloride in the procedure of Example 49 to yield divinylmercury.

Example 52

Antimony trichloride is substituted for boron trichloride in the procedure of Example 49 to yield trivinylantimony.

Example 53

Arsenic trichloride is substituted for boron trichloride in the procedure of Example 49 to yield trivinylarsine.

It is to be noted that the present invention provides a process for preparing Grignard reagents from vinylic chlorides and from a group of heterocyclic chlorides that could not be converted into Grignard reagents before my inventions. By utilizing my novel procedure it is possible to prepare these reagents economically using standard equipment and raw materials. This is strongly brought out in the fact that commercially available magnesium turnings are suitable as the magnesium source in my invention, whereas prior to my invention these reagents could not be prepared and when reagents that are more readily formed were prepared, it required the use of freshly cut magnesium chips.

The vinylic magnesium chlorides and the heterocyclic magnesium chlorides are useful as chemical intermediates in the preparing of many commercial and also of many novel organic compounds, as brought out hereinbefore. The organo magnesium chlorides are useful as ester interchange catalysts in preparing polyesters by condensing diesters of a dicarboxylic acid and polyhydroxy compounds. The vinyl magnesium compounds are also useful as Zeigler condensation catalysts and for the polymerization of ethylene to form polyethylenes.

While the invention has been described with particular reference to specific embodiments, it is to be understood that it is not limited thereto but is to be construed broadly and restricted solely by the scope of the appended claims.

What is claimed is:

1. A process for producing vinylmagnesium chloride which comprises reacting magnesium with vinyl chloride, the process being initiated by adding to the magnesium a small but sufficient amount of an ether solution of a reactive hydrocarbon halide selected from the group consisting of lower alkyl halides and mononuclear aryl halides to produce a reaction between the reactive hydrocarbon halide and the magnesium and thereafter adding to the magnesium a solution consisting of said vinyl chloride and at least an equimolar amount of an ethylene polyether having up to 10 carbon atoms and characterized by the general formula $$RO(CH_2CH_2O)_xR'$$

wherein $x$ is an integer from 1 to 4 and R and R' are alkyl radicals.

2. A process for producing vinylmagnesium chloride which comprises reacting magnesium with vinyl chloride, said reaction being carried out by adding to the magnesium a small but sufficient amount of ethyl bromide in ethyl ether solution to initiate reaction of the magnesium and thereafter adding at a rate sufficient to maintain the reaction a solution consisting of vinyl chloride in at least an equimolar amount of diethylene glycol diethyl ether.

References Cited in the file of this patent

UNITED STATES PATENTS

| | | |
|---|---|---|
| 2,552,676 | Hill | May 15, 1951 |
| 2,638,474 | Kruez | May 12, 1953 |

OTHER REFERENCES

Overhoff et al.: Rec. Trav. Chim., vol. 57, pp. 179–84 (1938).

Wright et al.: Industrial and Eng. Chem., vol. 40, No. 8, p. 1518.

Gilman et al.: Journ. Am. Chem. Soc., vol. 54, pp 733–736 (1932).

Wibaut et al.: Rec. Trav. Chim., vol. 71, pp. 798–804 (1952).

Synthetic Organic Chemicals (Eastman Kodak Co. Publication), vol. VI, No. 1, October 1932. (4 pages—second page.)

Inhoffen et al.: Chem. Ber., vol. 82, pp. 313–316 (1949).

Young et al.: Journ. Am. Chem. Soc., vol. 55, pp. 4908–4911 (1933).

Kharasch et al.: Grignard Reactions of Nonmetalic Substances, Prentice Hall, Inc., 1954, pp. 75–80.

Proost et al.: Rec. Trav. Chim., vol. 59, pp. 971–7 (1940).

Wibaut et al.: Rec. Trav. Chim., vol. 74, pp. 1003–1008 (1955).

Normant: Comptes Rendus, vol. 239, pp. 1510–12 (Nov. 29, 1954).

Fincini: Bull. Soc. Chim. France, vol. 23, pp. 119–124 (January 1956).